United States Patent
Kim et al.

[11] Patent Number: 5,980,079
[45] Date of Patent: Nov. 9, 1999

[54] SYNTHESIS OF THRESHOLD NETWORKS

[75] Inventors: Jung-Hwan Kim, Daejeon; Sung-Kwon Park, Seoul, both of Rep. of Korea

[73] Assignee: Electronics and Telecommunications Research Institute, Daejeon, Rep. of Korea

[21] Appl. No.: 08/708,544

[22] Filed: Sep. 5, 1996

[30] Foreign Application Priority Data

Dec. 21, 1995 [KR] Rep. of Korea ........................ 95-53633

[51] Int. Cl.⁶ ............................. G06F 15/18; G05B 13/02
[52] U.S. Cl. ................................. 364/148.02; 364/148.01; 706/25
[58] Field of Search ..................................... 364/148, 149, 364/150, 151, 152, 153, 158, 159, 160, 161–165, 148.02, 148.03, 148.1; 395/22–24, 2.11, 2.4, 2.41, 20, 10; 706/14, 15, 25, 22

[56] References Cited

U.S. PATENT DOCUMENTS 5,297,237  3/1994  Masuoka et al. ........................ 395/23
5,353,207  10/1994  Keeler et al. .......................... 364/164
5,396,565  3/1995  Asogawa .................................... 395/23
5,555,439  9/1996  Higashino et al. ....................... 395/23

*Primary Examiner*—Paul P. Gordon
*Attorney, Agent, or Firm*—Nixon & Vanderhye P.C.

[57] ABSTRACT

The learning algorithm called Expand-and-Truncate Learning (ETL) is invented to synthesize a three-layer threshold network (TLTN) with guaranteed convergence for an arbitrary switching function. There has not yet been found an algorithm to synthesize a threshold network for an arbitrary switching function. The most significant contribution of this invention is the development of a learning algorithm for a three-layer TLTN which guarantees convergence for any switching function, automatically determining a required number of threshold elements in the hidden layer. For example, it turns out that the required number of threshold elements in the hidden layer of a TLTN for an n-bit parity function is equal to n. The threshold element in the proposed TLTN employs only integer weights and integer thresholds. Therefore, this will greatly facilitate actual hardware implementation of the proposed TLTN using currently available digital VLSI technology.

1 Claim, 1 Drawing Sheet

SYNTHESIS OF THRESHOLD NETWORKS

BACKGROUND OF THE INVENTION

1. Field of the Invention

This invention pertains to computer systems and more particularly is concerned with artificial neural networks.

2. Related Art

Artificial neural networks (or in short neural networks) are powerful information processors. Neural networks are increasingly being applied today to solve problems in such diverse areas as speech recognition, expert system, process control, and robotics. They have a revolutionary potential exceeding far beyond their current capability. In 1969, Minsky and Papert proved that 2-layer perceptron networks were inadequate for many real-world problems such as the exclusive-OR(XOR) function and the parity problem which are basically linearly inseparable functions[MiPa69]. Kolmogorov and Stone-Weierstrass theorems have proved that three-layer neural networks can perform all real mapping. However, there has not been yet found a learning algorithm which can synthesize a three-layer threshold network (THTN) for an arbitrary switching function.

Recently, the Back-Propagation Learning (BPL) algorithm has been applied to many binary-to-binary mapping problems. Since the BPL algorithm requires that the activation function of a processing element (i.e. neuron) be differentiable and the activation function of a threshold element is not differentiable, BPL a algorithm can't be used to synthesize THTN a for an arbitrary switching function. Moreover, since the BPL algorithm searches the solution in continuous space, the BPL algorithm applied to binary-to-binary mapping problems results in long training times and inefficient performance.

SUMMARY OF THE INVENTION

According to an aspect of invention, there is provided a learning algorithm called Expand-and-Truncate Learning (ETL), to synthesize a three-layer threshold network (TLTN) with guaranteed convergence for an arbitrary switching function. TLTN consists of an input layer of only fanout gates, a hidden layer, and an output layer having only one threshold element. The threshold element in the proposed TLTN employs only integer weights and integer threshold. This will greatly facilitate hardware implementation of the proposed TLTN using currently available VLSI technology.

BRIEF DESCRIPTION OF THE DRAWING

The present invention will become more fully understood from the detailed description given hereinafter and the accompanying drawing and Table 1.

DETAILED DESCRIPTION OF THE INVENTION

Figure 1:
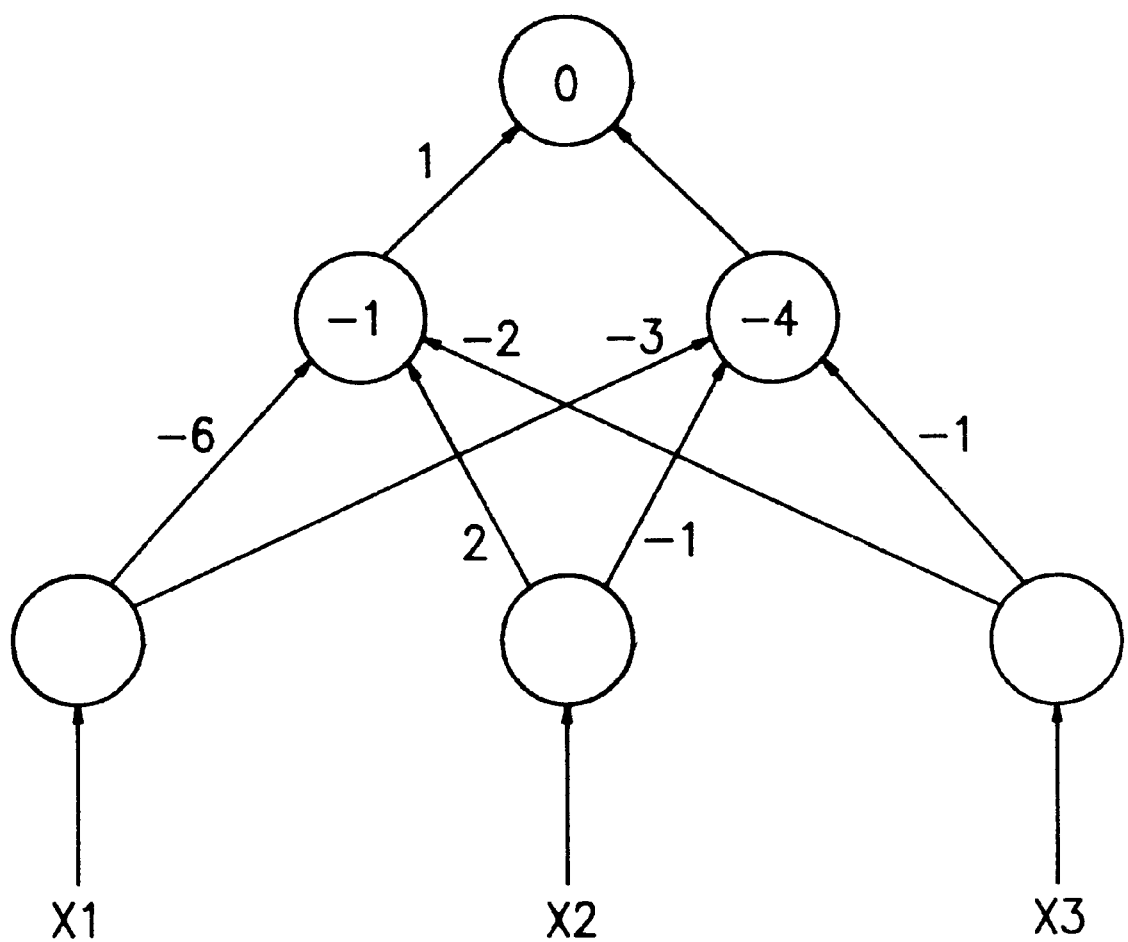
FIG. 1 is an illustration view showing the three-layer threshold network for the given example.

The proceeding background material is incorporated in this detailed description by reference. An understanding of the background material is necessary to comprehend the present invention. A purpose of the invention is to synthesize a three-layer threshold network (TLTN) with guaranteed convergence for an arbitrary switching function. The invention is not limited to a three-layer threshold network.

Suppose that an arbitrary n-variable switching function is given. That is, a set of n-bit training input vectors is given and a desired output is assigned to each training input vector. An n-bit input vector can be considered as a vertex of an n-dimensional hypercube. Also, assume that these two classes of training input vectors (i.e. vertices) can be separated by an (n−1)-dimensional hyperplane which is expressed as a net function, $$\text{net}(X,T) = w_1 x_1 + w_2 x_2 + \ldots + w_n x_n - T = 0 \tag{1}$$

where $w_i$'s and T are constant. In this case, the set of training inputs is said to be linearly separable (that is, the given switching function is a threshold function), and the (n−1)-dimensional hyperplane is the separating hyperplane. The (n−1)-dimensional separating hyperplanes can be established by an n-input threshold element. Actually a threshold function bears more information than a hyperplane. A threshold element assigns either one or zero to each side of a hyperplane, while a hyperplane merely defines a border between two groups of vertices. In order to match a separating hyperplane with a neuron, we need to properly assign either one or zero to each side of the separating hyperplane.

If a given switching function has the property of linear separability, then the function is a threshold function and can be realized by only one threshold element. However, if the given function is not a linearly separable (LS) function, then more than one threshold element is required to realize the function. The main problem is how to decompose the linearly inseparable function into two or more LS functions, and how to combine these LS functions. In this paper, we propose a method to decompose any linearly-inseparable function into multiple LS functions based on a geometrical approach, and to combine these LS functions to produce desired outputs. Our proposed method will show that an arbitrary switching function can be realized by a three-layer threshold network with one hidden layer.

1. Learning the Hidden Layer

In this section, the geometrical learning algorithm called Expand-and-Truncate Learning (ETL) is described to decompose an arbitrarily linearly inseparable function into multiple LS functions. For an arbitrary switching function, ETL will determine the necessary number of multiple LS functions, each of which is realized by a threshold element in the hidden layer.

ETL, finds a set of separating hyperplanes based on a geometrical analysis of the training inputs, so that inputs located between two neighboring hyperplanes have the same desired outputs. Since a separating hyperplane can be established by a threshold element, the number of required threshold elements in the hidden layer is equal to that of required hyperplanes.

Fundamental ideas behind the ETL algorithm are introduced using a simple example. For instance, let us consider a switching function of three input variables, $f(x_1,x_2,x_3)$. If inputs are {000,010,011,111}, then $f(x_1,x_2,x_3)$ produces output 1. If inputs are {001,100}, then $f(x_1,x_2,x_3)$ produces output 0. If input vertices are {101,110}, then we don't care what $f(x_1,x_2,x_3)$ produces. In other words, the given example can be considered as having six training inputs. An n-bit input can be considered as a vertex in an n-dimensional hypercube. A 3-bit input can be considered as a vertex of a unit cube. The vertex whose desired output is 1 and 0 is called a true vertex and a false vertex, respectively.

Definition:

A set of included true vertices (SITV) is a set of true vertices which can be separated from the rest of the vertices by a hyperplane.

The ETL algorithm begins by selecting a true vertex. The first selected true vertex is called a core vertex. The first vertex will be selected based on the clustering center found by the modified k-nearest neighboring algorithm. In this example, the first true vertex selected is {000}. Then, the hyperplane $-2x_1-x_2-2x_3+1=0$ will separate SITV {000, 010} from the other training vertices {001,100,011,111}. This hyperplane is geometrically expanded to add to SITV possibly more input vertices which produce same output, while keeping the linear-separability. This step will reduce the total number of required hyperplanes, i.e., the number of required neurons. To choose an input vertex to be included in SITV, it is logical to choose the nearest true vertex to the vertices in SITV in the Euclidian distance sense. There could be more than one. The reason to choose the nearest vertex first is that as the chosen vertex gets closer to the vertices in SITV, the probability that the vertices in SITV are separated from the rest of the vertices becomes higher. The nearest true vertex can be easily found by considering the Hamming distance (HD) from the vertices in SITV. In the given example, the nearest true vertex is {011}. Let's call this vertex a trial vertex. Expand the hyperplane to include a trial vertex {011} such that the hyperplane separates the true vertices in SITV {000,010,011} from the other training vertices {001,100,111}. To determine whether such a hyperplane exists and find the hyperplane, a geometrical approach is described next.

Consider a reference hypersphere (RHS), $$\left(x_1 - \frac{1}{2}\right)^2 + \left(x_2 - \frac{1}{2}\right)^2 + \cdots + \left(x_n - \frac{1}{2}\right)^2 = \frac{n}{4} \quad (2)$$

Notice that the center of the RHS is the center of the n-dimensional hypercube, and all the $2^n$ vertices are on the RHS. Now consider another n-dimensional hypersphere which has its center at $$\left(\frac{C_1}{C_0}, \frac{C_2}{C_0}, \cdots, \frac{C_n}{C_0}\right)$$

and its radius r. $C_0$ is the number of elements in SITV including the trial vertex. $C_i$ is calculated as follows:

$$C_i = \sum_{k=1}^{C_0} v_k^i,$$

where $v_k$ is an element in SITV, and $v_k^i$ is the ith bit of $v_k$. Notice that the point $$\left(\frac{C_1}{C_0}, \frac{C_2}{C_0}, \cdots, \frac{C_n}{C_0}\right)$$

in the n-dimensional space represents the center of gravity of all elements in SITV.

If SITV is linearly separated from the other training vertices, there must exist a hypersphere to include SITV and exclude the other training vertices. To find such a hypersphere, consider the hypersphere whose center is located at the center of gravity of all elements in SITV. If this hypersphere separates, this one can do with the minimum radius. On the other hand, a hypersphere with its center away from it must have a longer radius in order to include all the elements in SITV. This will obviously increase the chance of including non SITV elements. Hence, the hypersphere whose center is the center of gravity, is called as a separating hypersphere which is expressed is $$\left(x_1 - \frac{C_1}{C_0}\right)^2 + \left(x_2 - \frac{C_2}{C_0}\right)^2 + \cdots + \left(x_n - \frac{C_n}{C_0}\right)^2 = \gamma^2 \quad (3)$$

When this separating hypersphere intersects RHS, an (n−1)-dimensional hyperplane is found. By subtracting Eq. (2) and multiplying by $C_0$, we obtain the separating hyperplane as $$(2C_1-C_0)x_1+(2C_2-C_0)x_2+\ldots+(2C_n-C_0)x_n-T=0$$

where T is a constant.

That is, if there exists a separating hyperplane which separates SITV from other training vertices, $$\sum_{i=1}^{n}(2C_i - C_0)v_t^i - T \geq 0$$

for each vertex $v_t$ in SITV, and $$\sum_{i=1}^{n}(2C_i - C_0)v_r^i - T < 0$$

for each vertex $v_r$ from the rest vertices Therefore, each vertex $v_t$ in SITV and each vertex $v_r$ satisfy $$\sum_{i=1}^{n}(2C_i - C_0)v_t^i > \sum_{i=1}^{n}(2C_i - C_0)v_r^i.$$

Let $t_{min}$ be the minimum value of $$\sum_{i=1}^{n}(2C_i - C_0)v_t^i$$

among all vertices in SITV, and $f_{max}$ be the maximum of $$\sum_{i=1}^{n}(2C_i - C_0)v_r^i$$

among the rest vertices.

If $t_{min} > f_{max}$, then there exists a separating hyperplane which is $$(2C_1-C_0)x_1+(2C_2-C_0)x_2+\ldots+(2C_n-C_0)x_n-T=0$$

where $$T = \left\lceil \frac{t_{min} + f_{max}}{2} \right\rceil$$

and $\lceil \chi \rceil$ is the smallest integer than or equal to $\chi$. If $t_{min} \leq f_{max}$, then there does not exist a separating hyperplane, thus the trial vertex is removed from SITV.

To include more true vertices, another true vertex is chosen using the same criteria as earlier, and tested if the new trial vertex can be added to SITV. This procedure continues until no more true vertices can be added to SITV. If all true vertices are included in SITV, the given function is a LS function, and only one threshold element is required for the function. However, if all true vertices can not be included in SITV, more than one threshold element is required for the given function. The method to find the other required hyperplanes, i.e., the other threshold elements, is described next.

The reason why the first hyperplane could not expand to add more true vertices to SITV, is due to the existence of false vertices around the hypersphere. That is, these false vertices block the expansion of the first hypersphere. In order to train more vertices, the expanded hypersphere must include the false vertices in addition to the true vertices in SITV of the first hypersphere. For this reason, false vertices are converted into true vertices, and true vertices which are not in SITV are converted into false vertices. Here the desired output for each vertex is only temporarily converted. That is, the conversion is needed only to obtain the separating hyperplane. Now, expand the first hypersphere to add more true vertices to SITV, until no more true vertices can be added to SITV. When the expanded hypersphere meets with RHS, the second hyperplane (i.e. the second threshold element) is found.

If SITV includes all true vertices, then the geometrical learning is converged. Otherwise, the training vertices which are not in SITV are converted again, and the same procedure repeats again. The above procedure can get stuck even when there are more true vertices still left to be included. Consider the case that when ETL tries to add any true vertex to SITV, no true vertex can be included. In this case, ETL converts the not-included true vertices and false vertices into the false vertices and true vertices, respectively. When ETL tries to include any true vertex, no true vertex can be included even after conversion. Hence, the procedure is trapped and it can not proceed any more. This situation is due to the limited degree of freedom in separating hyperplanes using only integer coefficients (i.e. weights). If this situation does not occur until SITV includes all true vertices, the ETL algorithm is converged with finding all required threshold elements in the hidden layer.

If the above situation (i.e. no true vertex can be included even after conversion) occurs, ETL declares the true vertices in SITV as "don't care" vertices in order to consider these vertices no more in the finding of other required threshold elements. Then, ETL continues by selecting a new core vertex based on the clustering center among the remaining true vertices. Until all true vertices are included, ETL proceeds in the same way as explained earlier. Therefore, the convergence of the ETL algorithm is always guaranteed. The selection of core vertex is not unique in the process of finding separating hyperplanes. Accordingly, the number of separating hyperplanes for a given problem can vary depending upon the selection of the core vertex and the orderings of adding trial vertices. By trying all possible selections, the minimal number of separating hyperplanes can always be found. FIG. 1 shows the structure of the three-layer threshold network for the given 3-bit function example. Table 1 analyzes the outputs of threshold elements in the hidden layer for input vertices. In Table 1, notice that linearly inseparable input vertices are transformed into a linearly separable function in the hidden layer.

2. Learning an output layer

After all required hyperplanes (i.e. all required threshold elements on the hidden layer) are found, one threshold element is needed in the output layer, to combine the outputs of the threshold elements in the hidden layer. In this selection, we will discuss how to combine the outputs of hidden threshold elements in order to produce the desired output.

Definition:

A hidden threshold element is defined as a converted hidden threshold element, if the threshold element was determined by converted true vertices which are originally true vertices. If all required hidden threshold elements are found using only one core vertex, then every even-numbered hidden threshold element is a converted hidden threshold element, such as the second threshold element in FIG. 1.

If ETL finds all required separating hyperplanes with only one core vertex, the weights and threshold of one output threshold element are set as follows. The weight of the link from the odd-numbered hidden threshold element to the output threshold element is set to 1. The weight of the link from the even-numbered threshold element to the output threshold element is set to $-1$, since each even-numbered threshold element is a converted hidden threshold element. By setting the threshold of the output threshold element to 0 (1) if the hidden layer has an even (odd) number of threshold elements, the three-layer threshold network always produces the correct output to each training input. FIG. 1 shows the weights and the threshold of the output neuron for the given example, since ETL, finds all required hyperplanes with only one core vertex $\{000\}$.

If ETL uses more than one core vertex to find all required hyperplanes, the weights and threshold of the output threshold element cannot be determined straight-forwardly as above. For further discussion, we need the following definition.

Definition:

A positive successive product (PSP) function is defined as a boolean function which can be expressed as $$B(h_1, h_2, \ldots, h_n) = h_1 O(h_2 O(\ldots O(h_{n-1} O h_n))\ldots)$$

where the operator O or is either logical AND or logical OR. A PSP function can also be expressed as $$B(h_1, h_2, \ldots, h_n) = h_1 O(B(h_2, h_3, \ldots, h_n)),$$

and $$B(h_{n-1}, h_n) = h_{n-1} O h_n$$

An example of a PSP function is $$B(h_1, h_2, \ldots, h_7) = h_1 + h_2(h_3 + h_4(h_5 + h_6 h_7)).$$

From the definition of a PSP function, it can be easily shown that a PSP function is always a positive unate function [Muro71]. Note that a LS function is always a unate function, but a unate function is not always a LS function.

Theorem 1:

A PSP function is a LS function.

Proof:

Express a PSP function as $$B(h_1, h_2, \ldots, h_n) = h_1 O(B(h_2, h_3, \ldots, h_n))$$

then the function in the inner most nest is $$B(h_{n-1}, h_n) = h_{n-1} O h_n$$

First, consider the case that the operator O is logical OR, i.e., $B(h_{n-1}, h_n) = h_{n-1} + h_n$. $B(h_{n-1}, h_n)$ is clearly a LS function. Second, consider the case that the operator O is logical AND, i.e., $B(h_{n-1}, h_n) = h_{n-1} h_n$. $B(h_{n-1}, h_n)$ is also a LS function. Therefore, the function in the inner most nest, $B(h_{n-1}, h_n)$ is always a LS function. Since the function in the inner most nest can be considered as a binary variable to the function in the next nest, the function in next nest is also a LS function. Continuing this process, a PSP function can be expressed $B(h_1, h_2, \ldots, h_n) = h_1 O z$, where z is a binary variable corresponding to $B(h_1, h_2, \ldots, h_n)$. Therefore, a PSP function is clearly a LS function. <Q.E.D.>

The proofs of Theorem 1 as well as other Theorems are also given in [Kim93]. Theorem 1 means that a threshold element can realize any PSP function since a PSP function is a LS function. Using a PSP function, an output threshold element function can be expressed as the function of the outputs of the hidden threshold elements.

A threshold element is supposed to assign one to the side of a hyperplane having true vertices, and zero to the other side. However, in ETL a converted hidden threshold element assigns one to the side of a hyperplane having original false vertices and zero to the other side having original true vertices. Therefore, without transforming the outputs of converted hidden threshold elements, an output threshold element function can not be a PSP function of the outputs of hidden threshold elements. In order to make a PSP function, the output of each converted hidden threshold element is complemented and fed into the output threshold element. Complementing the output of a converted hidden threshold element is identical to multiplying by (−1) the weight from this threshold element to the output threshold element and subtracting this weight from the threshold of the output threshold element. That is, if the output threshold element is realized by the weight-threshold $\{w_1, w_2, \ldots, w_j, \ldots, w_n; T\}$ whose inputs are $h_1, h_2, \ldots, h_j', \ldots, h_n$, then the output threshold element is also realized by the weight-threshold $\{w_1, w_2, \ldots, -w_j, \ldots, w_n; T-w_j\}$ whose inputs are $h_1, h_2, \ldots, h_j, \ldots, h_n$.

Theorem 2:

After the hidden threshold elements are determined by ETL an output threshold element function can always be expressed as a PSP function of the outputs of hidden threshold elements if the output of each converted hidden threshold element is complemented.

Proof:

Without loss of generality, let's assume that ETL finds $i_1$ hidden neurons $\{n_{11}, n_{12}, \ldots, n_{1i_1}\}$ from the 1st core vertex, $i_2$ hidden neutrons $\{n_{21}, n_{22}, \ldots, n_{2i_2}\}$ from the 2nd core vertex, and $i_k$ hidden neurons $\{n_{k1}, n_{k2}, \ldots, n_{ki_k}\}$ from the kth core vertex. Let $h_{ij}$ be either the output of the $n_{ij}$ neuron if j is an odd number, or the complemented output of the $n_{ij}$ neuron if j is an even number (i.e. $n_{ij}$ is a converted hidden neuron). The first neuron $n_{11}$ separates only true vertices. Hence, if $h_{11}=1$, then the output of the output neuron should be one regardless of the outputs of other hidden neurons. Therefore, the output neuron function can be expressed as $$B(h_{11}, h_{12}, \ldots, h_{ki_k}) = h_{11} + (B(h_{12}, \ldots, h_{ki_k})),$$

representing a logical OR operation. The second neuron $n_{ij}$ separates only false vertices. Thus, the side of a hyperplane for $h_{12}=1$ includes true vertices as well as false vertices, and true vertices will be separated by the following hidden neurons. Note that the true vertices which are not separated by $n_{11}$ are located only in the side of a hyperplane for $h_{12}=1$. Therefore, the output neuron function can be expressed as $$B(h_{11}, h_{12}, \ldots, h_{ki_k}) = h_{11} + (B(h_{12}, \ldots, h_{ki_k})) = h_{11} + h_{12}(B(h_{13}, \ldots, h_{ki_k}))$$

representing a logical AND operation.

Now, we can generalize for a neuron $n_{ij}$ as follows. If j is an odd number, then $B(h_{ij}, h_{ij+1}, \ldots, h_{ki_k}) = h_{ij} + B(h_{ij+1}, \ldots, h_{ki_k})$, representing a logical OR operation, and if j is an even number, then $B(h_{ij}, h_{ij+1}, \ldots, h_{ki_k}) = h_{ij}(B(h_{ij+1}, \ldots, h_{ki_k}))$, representing a logical AND operation. Therefore, the output neuron function can be always be expressed as a PSP function $$B(h_{11}, h_{12}, \ldots, h_{ki_k}) = h_{11} O(h_{12} O(\ldots O(h_{nk_k-1} O\ h_{ki_k})) \ldots)$$

where the operator O following $h_{ij}$ indicates logical OR if j is a LS function of the outputs of hidden threshold element. The way to determine the weights of the output threshold element is to find a PSP function, and then transform the PSP function into the net function. For an n variable PSP function $f(h_1, h_2, \ldots, h_n)$, there exists a systematic method to generate a net function, net(H,T). The systematic method is given next.

First, the method starts from the innermost net function $net_n$. The $net_n$ is set to $h_n-1$ since $net_n \geq 0$ if $h_n=1$ and $net_n<0$ if $h_n=0$. Let's find the next net function $net_{n-1}$. If the operation between $h_n$ and $h_{n-1}$ is a logical OR, then $net_{n-1}=(-Min[net_n])h_{n-1}+net_n$, where $Min[net_n]$ is the minimum value of $net_n$. Since $Min[net_n]=Min[h_n-1]=-1$, $net_{n-1}=h_{n-1}+h_n-1$. If the operation between $h_n$ and $h_{n-1}$ is a logical AND, then $net_{n-1}=(Max[net_n]+1)h_{n-1}+net_n-(Max[net_n]+1)$, where $Max[net_n]$ is the maximum value of $net_n$. Since $Max[net_n]=Max[h_n-1]=0$, $net_{n-1}=h_{n-1}+h_n-2$. Continuing this process, the net function net(H,T) is determined. The connection weight between the output threshold element and the ith hidden threshold element is the coefficient of $h_i$ in the net function, and the threshold of the output threshold element is the constant in the net function.

From the above discussion, we can formally state the following theorem.

Theorem 3:

For an arbitrary switching function, the proposed ETL algorithm always converges and synthesizes the three-layer threshold network whose hidden layer has as many threshold elements as separating hyperplanes.

In general, the three-layer threshold network for an n-bit parity function can be synthesized as follows. The number of required hidden threshold elements is n. The threshold of the ith hidden threshold element is set to n−(i−1), assuming that the input vertex $\{1111\}$ is selected as a core vertex. That is, the ith hyperplane (i.e. the ith threshold element)

$$x_1+x_2+\ldots+x_n=n-(i-1)$$

separates the vertices whose HD from the core vertex is less than i, from the rest vertices whose HD from the core vertex is equal to or greater than i. For an n-bit odd-parity function, the weights of the output threshold element are set such that the weight from the ith hidden threshold element is set to $(-1)^n$ if i is an odd number, and set to $(-1)^{n+1}$ if i is an even number, and the threshold of the output threshold element is set to 0. For an n-bit even-parity function, the weights of output threshold element are set such that the weight from the ith hidden threshold element is set to $(-1)^n$ if i is an odd number, and set to $(-1)^{n+1}$ if i is an even number, and the threshold is set to 1.

The following Table 1 shows the analysis of the hidden layer for the above-given example:

TABLE 1

The analysis of the hidden layer for the given example

| | | Hidden layer | | Output |
|---|---|---|---|---|
| Input | Desired output | 1st threshold element | 2nd threshold element | threshold element |
| 000, 010, 011 | 1 | 1 | 1 | 1 |
| 001, 100 | 0 | 0 | 1 | 0 |
| 111 | 1 | 0 | 0 | 1 |

The best mode of the invention has been described. With these description, equivalent alternatives will be apparent to those skilled in the art. Accordingly the scope of the invention should be determined by the claims and equivalents thereof.

What is claimed is:

1. A method for synthesizing a three layer threshold network (TLTN) with guaranteed convergence for an arbitrary switching function, said method comprising an expand and truncate learning (ETL) process including:

decomposing a linearly inseparable function into multiple linearly separable (LS) functions which each include a threshold element in a hidden layer of said TLTN, said decomposing step including determining a set of all separating hyperplanes, based on a geometrical analysis of training inputs with inputs located between two neighboring hyperplanes having the same outputs, the number of required threshold elements in the hidden layer being equal to the number of required hyperplanes;

said determining step including selection of a first true vertex having a true value is one of the set of true input vertices that are separated from the rest of the input vertices by a hyperplane, said first true vertex being a core vertex selected based on the clustering center found by a modified k-nearest neighboring algorithm; and reducing the total number of required hyperplanes by geometrically expanding the hyperplane to add possibly more input vertices to the set of included true vertices (SITV) which produce the same output while still maintaining linear separability.

* * * * *